(12) United States Patent
Wolf et al.

(10) Patent No.: US 6,463,508 B1
(45) Date of Patent: Oct. 8, 2002

(54) METHOD AND APPARATUS FOR CACHING A MEDIA STREAM

(75) Inventors: Joel L. Wolf, Goldens Bridge; Philip Shi-lung Yu, Chappaqua, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/357,059

(22) Filed: Jul. 19, 1999

(51) Int. Cl.⁷ .............................................. G06F 12/12
(52) U.S. Cl. ..................... 711/133; 711/130; 711/159
(58) Field of Search ................................. 709/217, 219, 709/216, 225; 711/118, 130, 133, 134, 159, 124; 712/237

(56) References Cited

U.S. PATENT DOCUMENTS

| | | | |
|---|---|---|---|
| 5,467,460 A | * 11/1995 | Patel | 711/143 |
| 5,878,223 A | * 3/1999 | Becker et al. | 709/223 |
| 5,924,116 A | * 7/1999 | Aggarwal et al. | 711/122 |
| 6,065,058 A | * 5/2000 | Hailpern et al. | 709/231 |
| 6,085,193 A | * 7/2000 | Malkin et al. | 707/10 |
| 6,243,791 B1 | * 6/2001 | Vondran, Jr. | 711/120 |

* cited by examiner

Primary Examiner—B. James Peikari
(74) Attorney, Agent, or Firm—Scully, Scott, Murphy & Presser; Gail H. Zarick

(57) ABSTRACT

A system and method for caching media streams at proxy servers. In the current invention, blocks received for a media stream are grouped into segments by the proxy servers, where the cache admission and replacement policies attach a different caching value to different segments, taking into account the segment distance to the start of the media object. These policies give preferential treatment to the beginning segments and may take into account other considerations such as the media object reference frequency, time since the last reference to the object, or its access time. According to the invention, the proxy server is enabled to cache a subset of the segments, which will generally be the beginning segments. According to another aspect of the invention, if only a portion of a media stream is cached in the proxy server when the stream is requested, the remaining segments are prefetched. Thus, upon receipt of a media request, the proxy can immediate serve the request using the segments cached, and compose and issue a prefetch request to obtain the remaining blocks for segments which are not currently cached.

47 Claims, 10 Drawing Sheets

METHOD AND APPARATUS FOR CACHING A MEDIA STREAM

BACKGROUND OF THE INVENTION

1. Field of the Invention

The present invention relates generally to systems and methods for delivering video or audio streams over the World Wide Web and, particularly, to a system and method of caching media streams for delivering multimedia (video/audio) objects through proxy servers.

2. Discussion of the Prior Art

The recent increase in popularity of the World Wide Web (WWW or web) has led to a considerable increase in the amount of traffic over the Internet. As a result, the web has now become one of the primary bottlenecks of network performance. When web objects are requested by a user who is connected to a server via a slow network link there can be noticeable latency at the user end. Further, transferring web objects over the network leads to an increase in the level of traffic over the network. This reduces the bandwidth available for other requests, especially when large media objects are transferred. In order to facilitate the deliver of Web objects to users, it is desirable to install proxy servers which can cache web objects to facilitate the content distribution and reduce access delays.

Previous work on caching of web objects mainly relates to on-demand caching of the whole web object, i.e., a caching decision is made after the object is requested as to whether to cache the object. See, for example, the references entitled "Caching Proxies: Limitations and Potentials", Proc. 4th International World Wide Web Conference, 1996, by Abrams et. el., and "Caching on the World Wide Web", IEEE Trans. on Knowledge and Data Engineering, vol. 11, No. 1, January 1999, pp. 94–107, by C. Aggarwal, et al., for different web caching polices. In commonly owned, co-pending U.S. patent application Ser. No. 08/831,237, entitled "Collaborative Caching", now U.S. Pat. No. 5,924,116, a collaborating caching method among the proxies is considered. In commonly owned U.S. patent application Ser. No. 08/854,226, entitled "Dynamic Push Filtering with Staging/Buffering in a Proxy Hierarchy", now U.S. Pat. No. 6,065,058 a push filtering method is proposed in which meta information is used to facilitate the push filtering and staging or caching decision.

In commonly owned U.S. Pat. No. 5,878,223, entitled "System and Method for Predictive Caching of Information Pages", the server determines and sends the pages predicted to be requested next to the requesting computer without a specific request by the user. This is basically a sender initiated approach. In commonly owned U.S. patent application Ser. No. 08/939,277, entitled "Method for Dynamically Prefetching Information via a Server", now U.S. Pat. No. 6,085,193, a prefetching method is provided which can incorporate user specific information dynamically into the object selections. This provides an improved method for prefetching in a proxy hierarchy in order to reduce object access through the network (internet) by analyzing and identifying the common user reference patterns at the content server and proxy sites and providing Prefetch Hint Information (PHI) on related accesses via meta information piggybacked with the requested object. The PHI gets updated as the object passes through the proxy hierarchy to reflect prefetch operations performed and caching status at the higher levels of the hierarchy, and other considerations such as local reference patterns.

As requests for and delivery of streaming video and audio over the web becomes more popular, proper caching of media objects becomes increasingly important. In addition to the large bandwidth requirement, there is an isochronism requirement for the media stream. Caching can certainly help addressing these issues. However, for a large media file, such as a 2-hour video, treating the whole video as a single web object to be cached is impractical. Even a simple division of the media file into smaller web objects will not be efficient for caching purposes.

Recently, there have been developed several companies that provide multimedia content distribution services using a number of caching proxies distributed over different geographic locations. These companies include Akamai (www.akamia.com) and Sandpiper (www.sandpiper.net). Sandpiper uses the Inktomi Traffic Server (www.inktomi.com) in which the proxy server will get the video file from the content server upon the first client request and cache the whole video file so that subsequent requests to the same video can be served from the proxy cache.

It would be highly desirable to provide a system and method that enables more intelligent partial caching of media streams at proxy servers.

SUMMARY OF THE INVENTION

The present invention pertains to an improved method and apparatus for caching media streams at one or more proxy servers. In the current invention, blocks received for a media stream are grouped into segments by the proxy servers, where the cache admission and replacement policies attach a different caching value to different segments, taking into account the segment distance to the start of the media object. These policies may give preferential treatment to the beginning segments and may take into account other considerations such as the media object reference frequency, time since the last reference to the object, or its access time.

The present invention enables the proxy server to cache a subset of the segments, which will generally be the beginning segments.

In another aspect of the present invention, if only a portion of a media stream is cached in the proxy server when the stream is requested, a method is provided to prefetch the remaining segments. Upon a media request, the proxy can immediate serve the request using the segments cached, and compose and issue a prefetch request to obtain the remaining blocks for segments which are not currently cached.

To improve the manageability (or, more specifically, tracking overhead) of the segments and caching efficiency, a method is provided to divide the media object into unequal size segments, where a segment further away from the start will be assigned a larger number of blocks.

Advantageously, the approach of the invention is readily generalized to the case of a caching system implementing multiple proxies.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
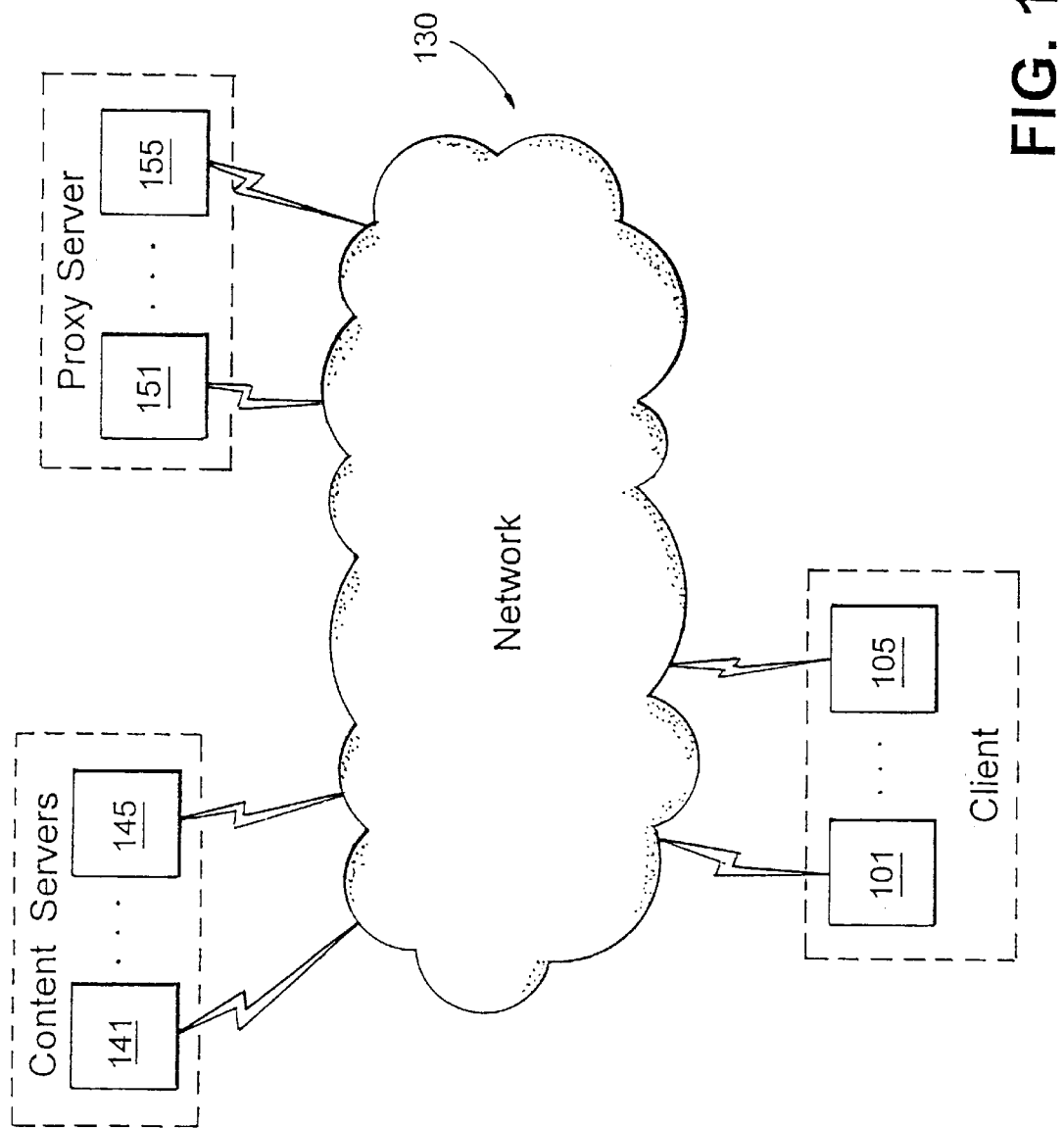
FIG. 1 illustrates an internet environment implementing features of the present invention.

FIG. 1 illustrates a diagram of a networked environment, e.g., the Internet. Client stations 101, . . . ,105 are connected through a network 130 to access information and request the playout of media objects or files, which include video and audio streams. Through the network, various content servers or web sites 141, . . . , 145 can be accessed. Proxy servers 151, . . . , 155 are introduced to facilitate the content delivery through caching.

Examples of a client include, but are not limited to, PC, workstation, set top box, etc. An example of the proxy server is the Internet Connection Server (ICS) commercially available from the assignee of the present invention. Examples of the network include, but are not limited to, the Internet, the World Wide Web, an intranet and local area networks (LANs). Examples of a content server may include, but are not limited to, a Lotus Go Web server or a Lotus Domino server. The proxy server or content server may run on any computing node, which includes, but is not limited to, products such as are sold, for example, by the current assignee under the trademarks S/390 SYSPLEX, SP2, or RS6000 workstations. Typical service requests include World-Wide-Web page accesses, remote file transfers, electronic mail, and transaction support.

Figure 2:
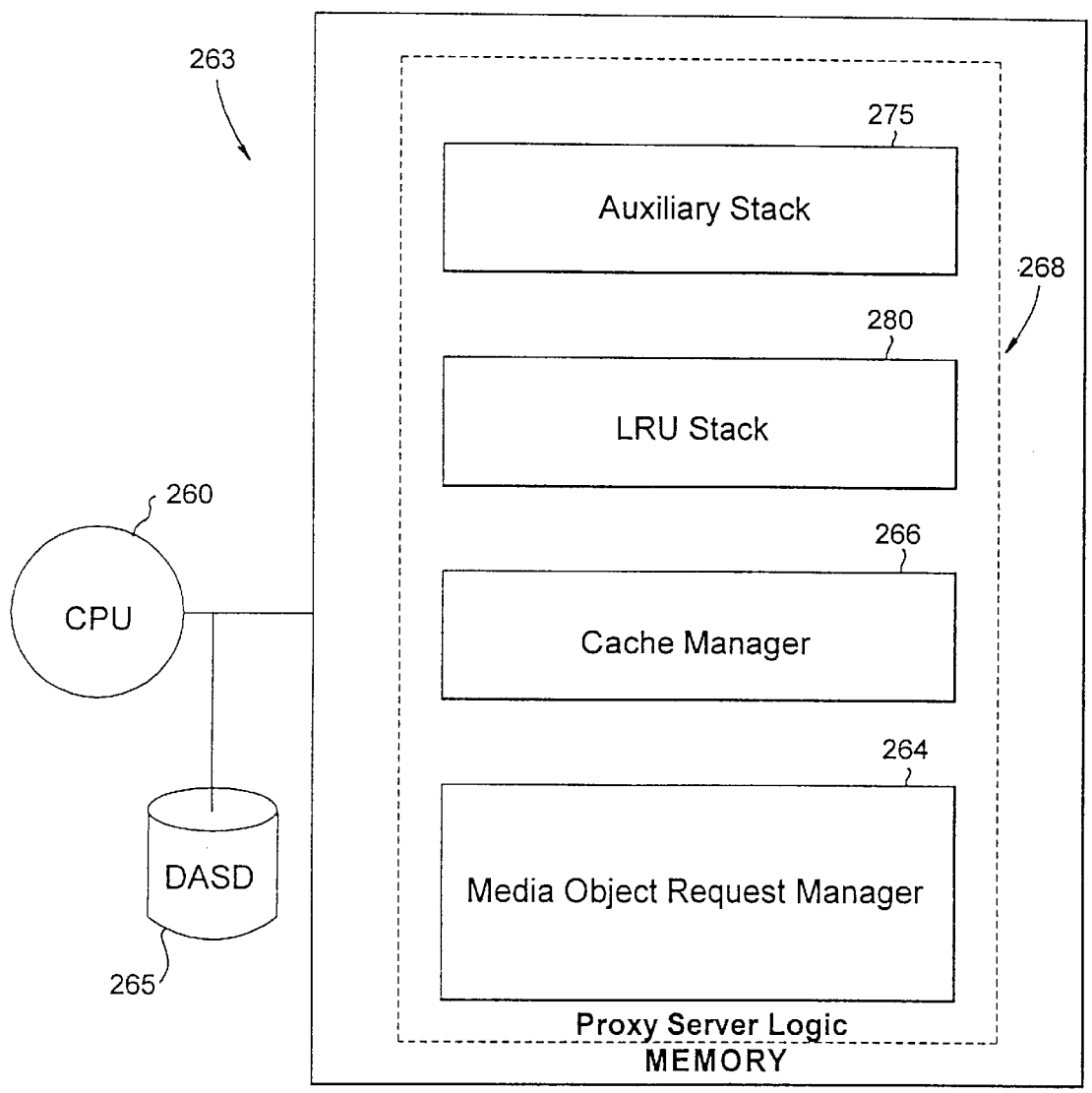
FIG. 2 illustrates the architecture of a proxy server according to the invention.

FIG. 2 illustrates the proxy server architecture 151. As depicted in FIG. 2, the proxy server node preferably includes a CPU 260, a RAM memory 263, and storage devices 265 such as DASD. The memory 263 stores the proxy server logic 268 (as will be described in greater detail herein with respect to FIG. 4) which is preferably embodied as computer executable code loaded from the DASD 265 into memory 263 for execution by CPU 260. The proxy server logic includes a media object request handler 264 (as will be described in greater detail herein with respect to FIG. 5) and a cache manager routine 266 (as will be described in greater detail herein with respect to FIG. 7). The main memory 263 includes several structures which are relevant to the caching. An auxiliary stack 275 is maintained at each proxy node having entries comprising the identity (e.g. URL) of an object and its last referenced time. The auxiliary stack performs the admission control (as will be described in greater detail herein with respect to FIG. 8), and determines the reference frequency of the object. Each proxy node main memory additionally includes an LRU stack structure 280 which is required in order to perform cache replacement by the cache manager routine 266. The scheme may be used either for main memory 263 or disk caching.

Figure 3:
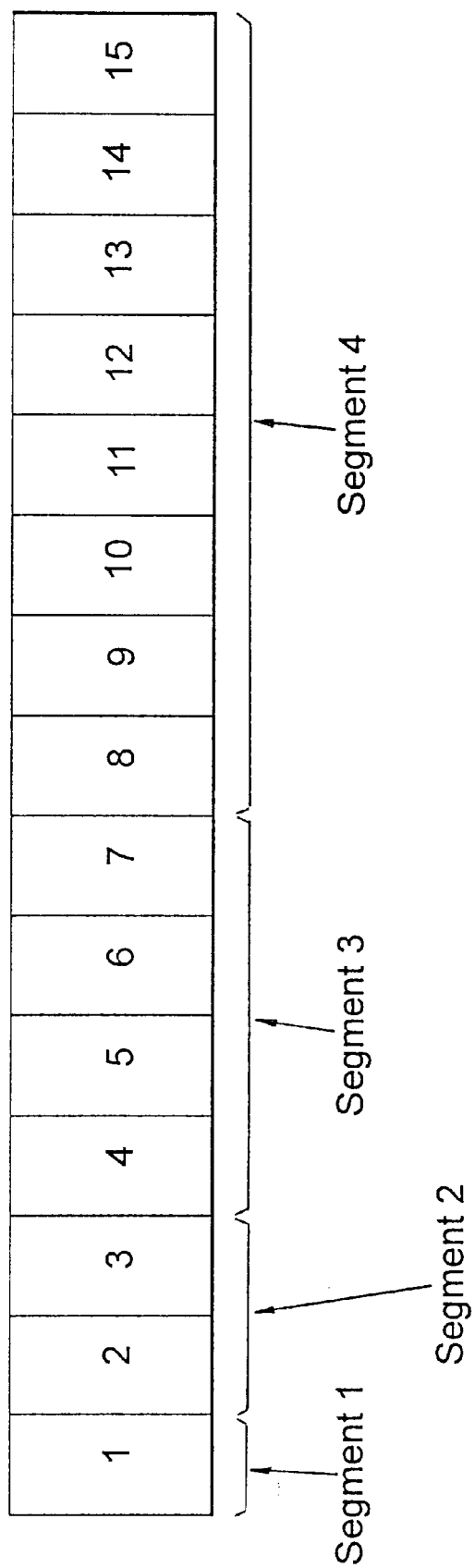
FIG. 3 is a diagram depicting object segmentation.

The preferred embodiment of the invention focuses on the caching of media objects. Efficient caching is particularly important when there is a large number of big media objects such as two hour-long videos. FIG. 3 illustrates how a media object may be segmented according to the invention. Each media object 60 comprises multiple media blocks $60a, \ldots, 60n$ which are the atomic units of transfer over the network. For ease of cache management, the blocks are grouped into segments $70a, \ldots, 70n$. In the preferred embodiment, a segment $70a, \ldots, 70n$ is the unit of media object caching at the proxy server. It should be understood that the number of blocks comprising each segment need not be the same. For instance, in the preferred embodiment, the segments further away from the start of the object are assigned a progressively larger number of blocks. In FIG. 3, the i-th segment, e.g., segment 4, may contain twice the number of blocks of the (i−1)-th segment, e.g., segment 3.

The segmentation process is transparent to the media content provider or the media viewer. It is an artifact introduced by the proxy server to make cache management more effective. The basic concept is to create smaller size segments at the beginning and give them higher caching priorities. This is simply because the initial segment determines the latency to the users, and hence is more important to cache. The later segments are made bigger to reduce the number of segments to track and manage. They only affect the total traffic in the network. Since with the initial segments cached the later segments may be prefetched, the isochronic requirement on the delivery is thus relaxed.

Figure 4:
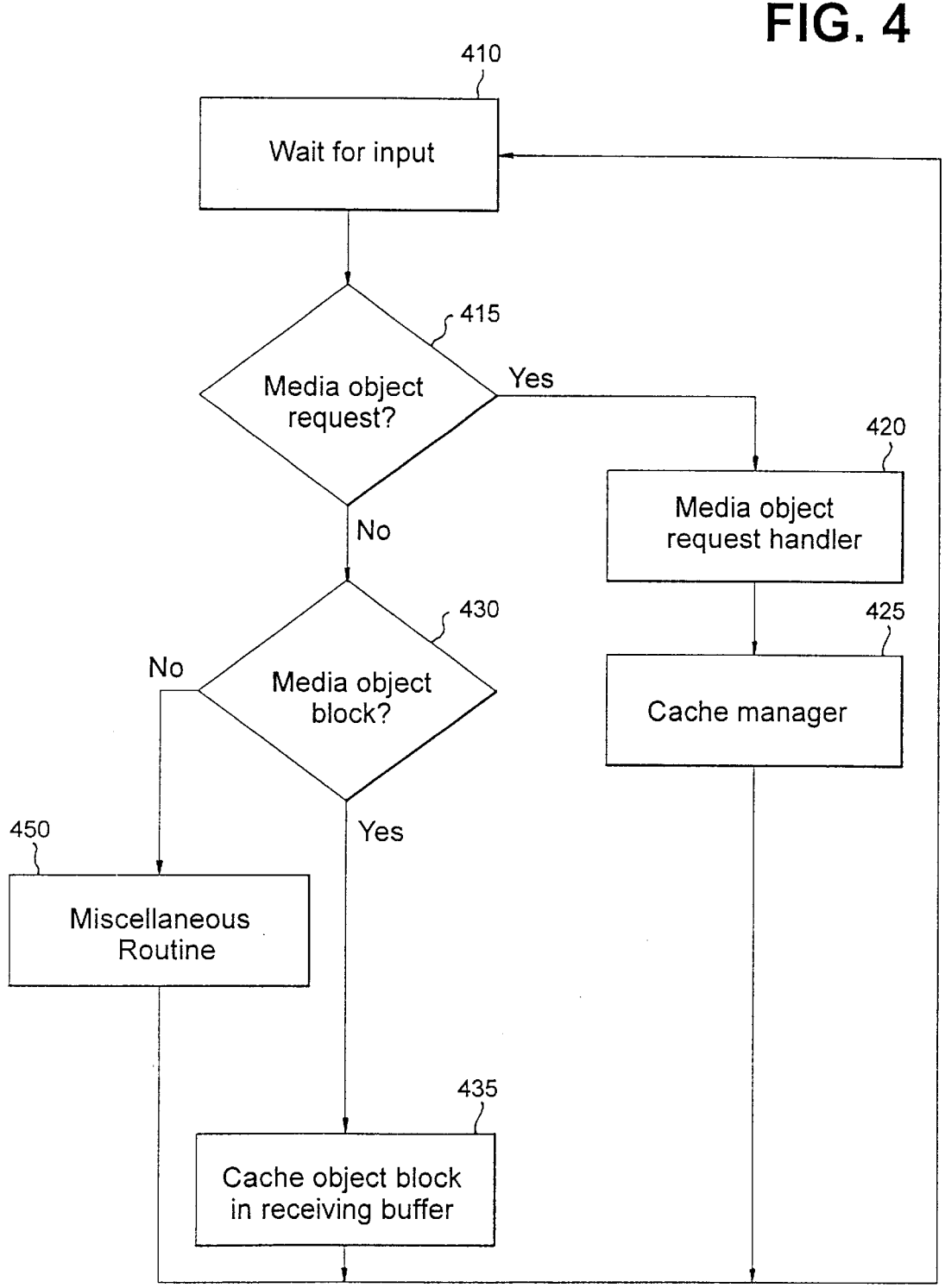
FIG. 4 is a flowchart depicting the proxy server workflow.

FIG. 4 illustrates the proxy server workflow process. As indicated at step 410, the proxy server waits for an input which may include a media object request, a media object block, or other input requests. Different actions will be taken depending upon the input received. As determined at step 415, if the input received is a media object request (which may be a video or audio request from a lower level proxy or client), the media object request handler will be invoked at step 420. A detailed description of the media object request handling process is described hereinbelow with respect to FIG. 5. Then, as indicated at step 425, the cache manager is invoked to determine whether some segments of the media object requested should be cached. A detailed description of the cache management process is described hereinbelow with respect to FIG. 7. If, at step 415, the input received is not a media object request, then the process proceeds to step 430 to determine if the input is a media object block. If the input is a media object block (e.g., from a higher level proxy or content server), then at step 435, the object block is cached in the receiving buffer to be handled subsequently by the streaming routine. A detailed description of the media streaming process is described hereinbelow with respect to FIG. 6. If, at step 430, it is determined that the input is not a media object block, but another type of input, e.g., remote file transfers, electronic mail, or web page requests, then at step 450, a miscellaneous handler routine may be invoked for handling these types of input requests.

Figure 5:
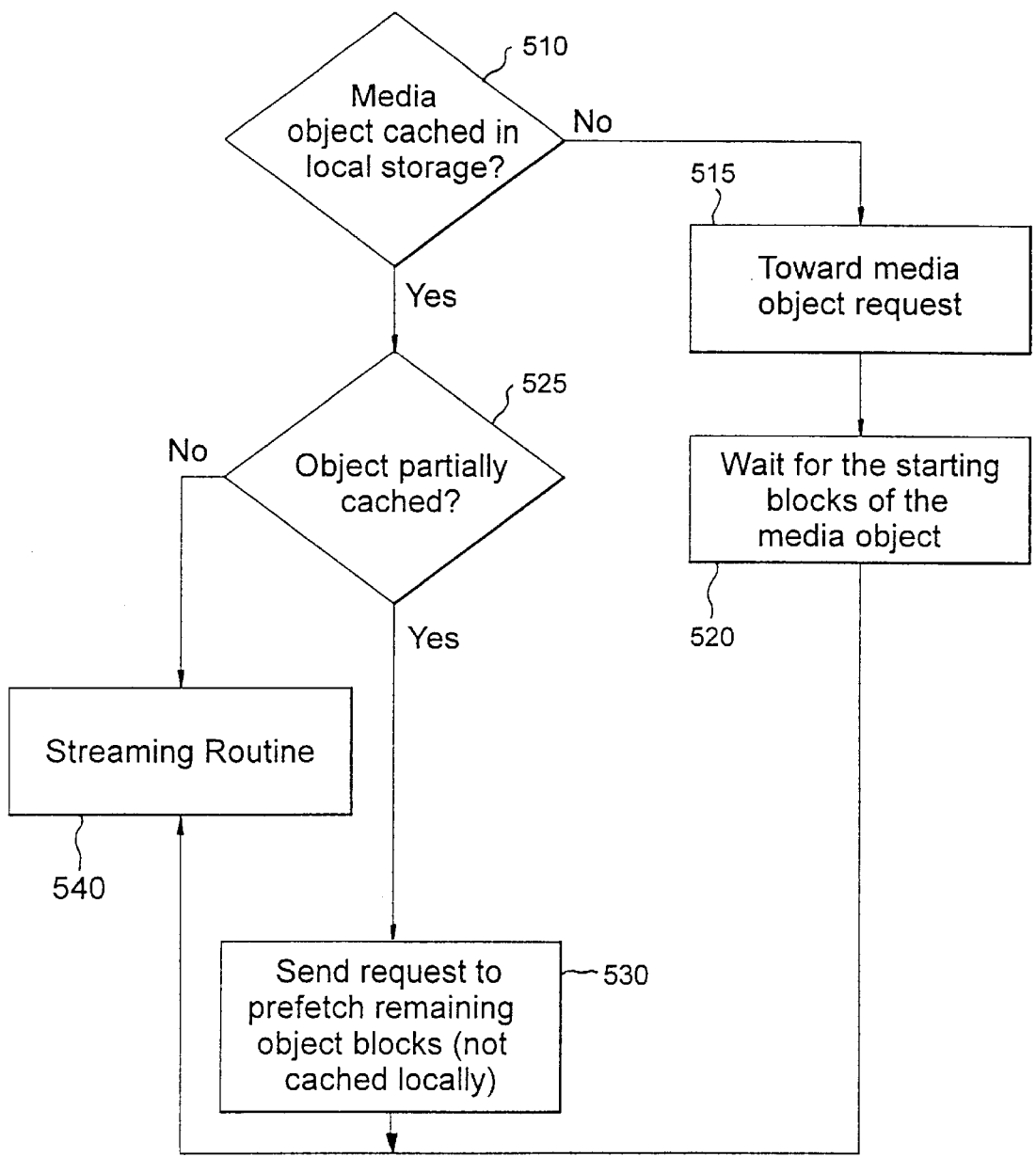
FIG. 5 is a flowchart depicting the media object request handler according to the invention.

As mentioned, FIG. 5 is a flowchart depicting the media object request handler routine according to the invention. As indicated at step 510, the proxy server first checks whether the requested media object is already cached in its local storage. If the requested media object is not cached, then at step 515 the proxy server forwards the object request to the content server or the next level proxy having the requested media object. At step 520, the handler waits for the starting blocks of the requested media object to arrive for subsequent media object streaming, as indicated at step 540. Returning to step 510, if it is determined that the requested media object is cached in local storage, then, at step 525, a determination is made as to whether the media object is only partially cached. If media object is only partially cached, then at step 530, the request handler sends a request to prefetch the remaining object blocks not cached locally from the content server or the next level proxy. By prefetching the remaining blocks, the isochronous requirement of delivering a media stream is relaxed. As indicated at step 540, the proxy invokes the streaming routine to deliver the media stream to the requesting client.

As will be described in greater detail herein, based on an applied admission control policy described with respect to FIG. 8 and a cache replacement routine described with respect to FIG. 9, the highest number segment cached for a given object is always the last one included into the cache and the first one to be replaced. Each partially cached object always gets a consecutive set of segments cached starting from the beginning. Thus, when a request for a partially cached object is received, the proxy server may start to deliver the media object (step 540) as shown in FIG. 5. At the same time, it may compose a prefetch request to get the missing segments (step 530) as shown in FIG. 5, and buffer them in local storage when received (step 435, in FIG. 4). Subsequently, these segments will be delivered based on the timing requirement of the media delivery as will be described herein with respect to the streaming routine process flow of FIG. 6. Since the segments cached are the beginning chunks of (e.g., IXF) segments, where IXF denotes the first segment of an object O which is not cached, the prefetch request is a request for the media blocks starting from block number h (IXF) to the end, where h(IXF) represents the starting block number of segment IXF.

Figure 6:
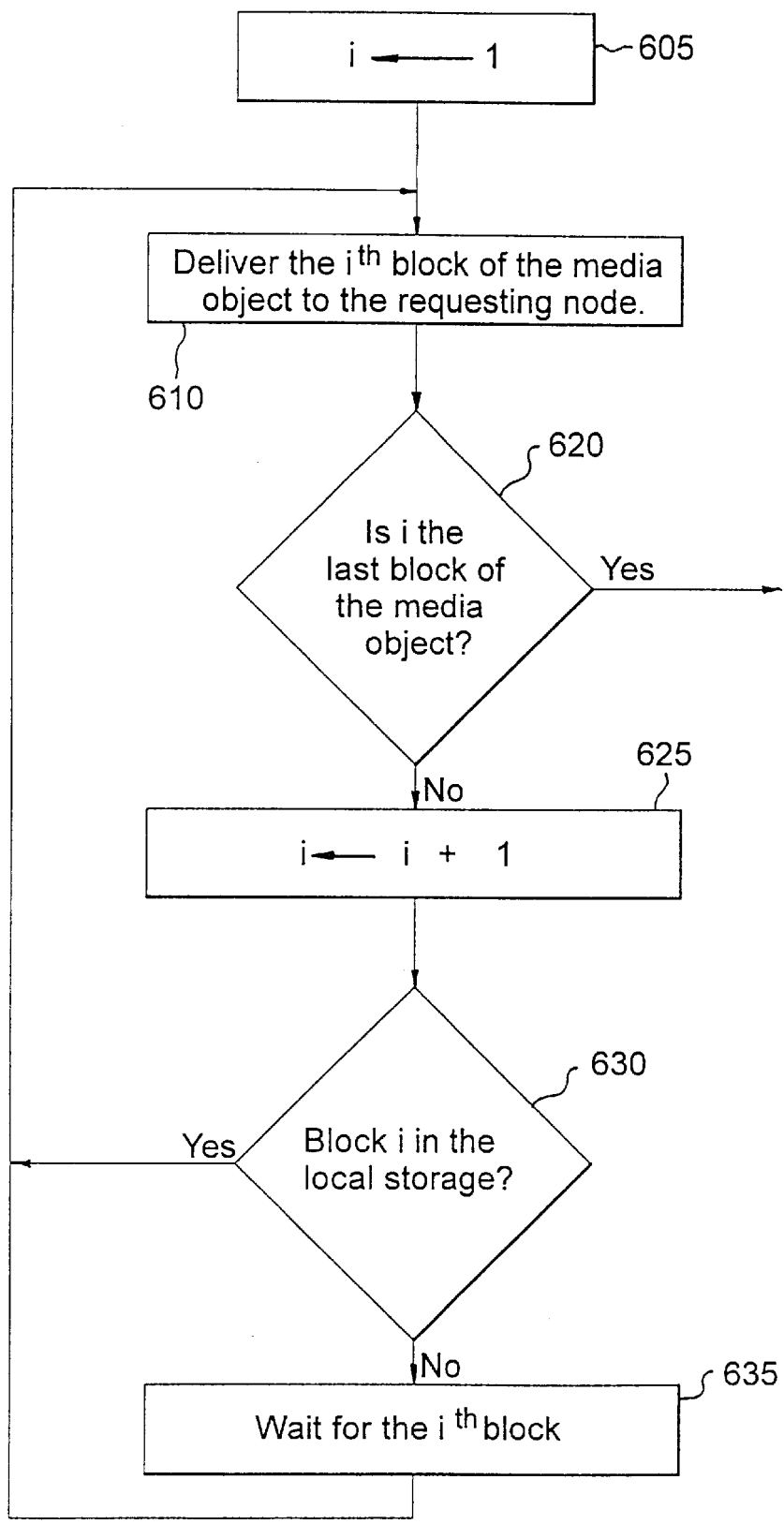
FIG. 6 is a flowchart depicting the streaming routine according to the invention.

FIG. 6 is a flowchart depicting the streaming routine according to the invention. At a first step 605, the index i is set to 1. Next, at step 610, the proxy delivers the $i^{th}$ block of the media object to the requesting node. Then, at step 620, a determination is made as to whether the $i^{th}$ block is the last block of the media object. If the $i^{th}$ block is not the last block of the media object, then at step 625, the index i is incremented by 1. Then, at step 630, a determination is made as to whether block i is available in the local storage. If block i is available in the local storage, then the process returns to step 610 to deliver that block. If block i is not available in the local storage, then at step 635, the proxy waits for the $i^{th}$ block to arrive before returning to step 610.

Figure 7:
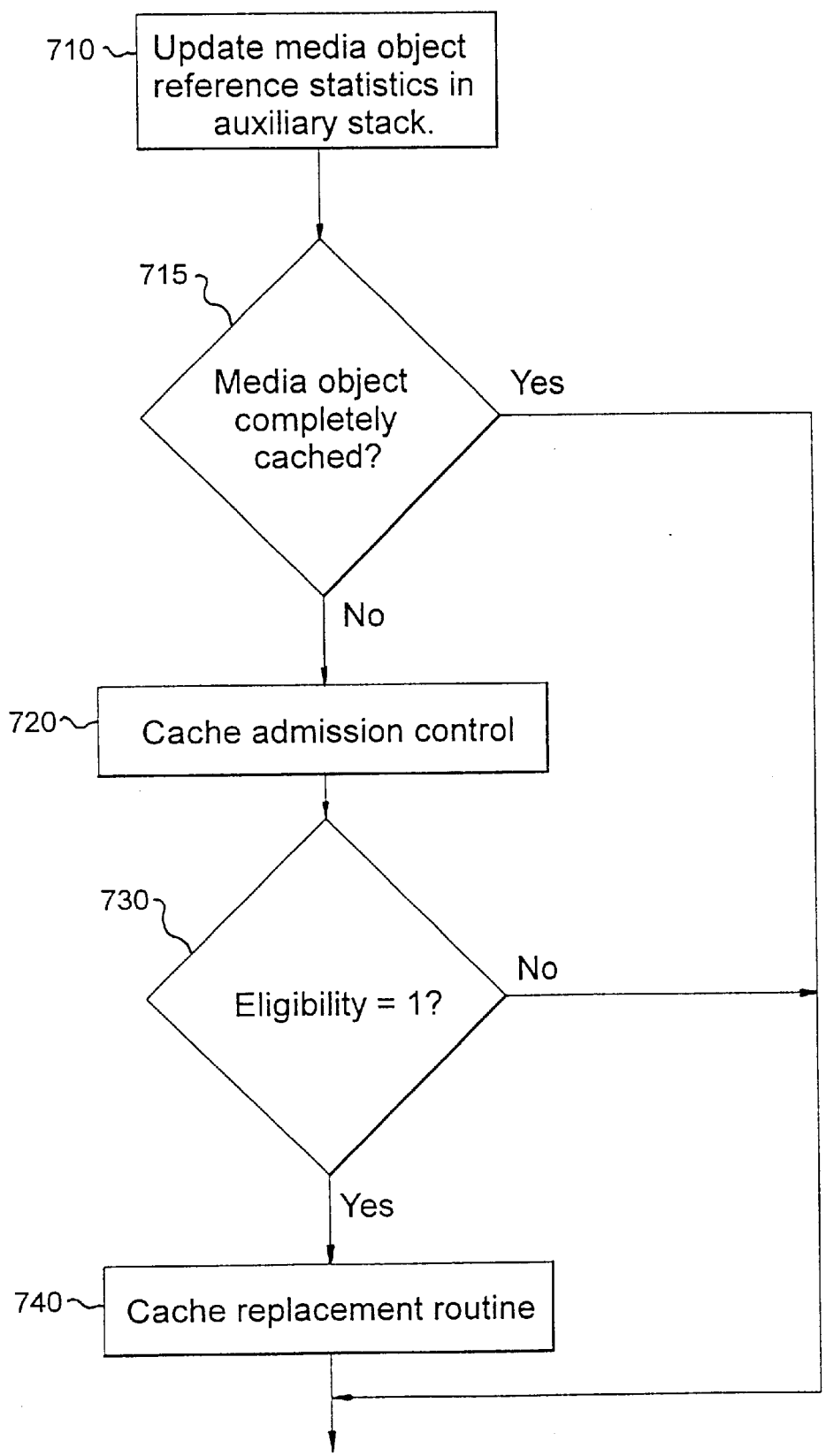
FIG. 7 is a flowchart depicting the cache manager routine according to the invention.

FIG. 7 is a flowchart depicting the cache manager routine according to the invention. As indicated at step 710, the proxy updates the reference statistics corresponding to the media object in the auxiliary stack (FIG. 2). Rather than storing the actual media objects themselves, the auxiliary stack includes media object identities and associated time stamps representing the last time the media object is requested. The first time an object is requested, it is added to the top of the auxiliary stack. Subsequent requests to an object in the auxiliary stack results in updates to its time stamp and movement of the object entry to the top of the stack. The entries in the auxiliary stack reflect the list of objects recently requested. Only a subset of these objects are cached in the local buffer. Thus, the number of entries of the auxiliary stack may be several times (e.g., four times) the number of media objects cached in the buffer. In contrast, the LRU stack tracks the objects that have some segments cached in the buffer in order of the last reference time. In FIG. 7, at step 715, a determination is made as to whether all segments in the media object have already been cached, i.e. the object is completely cached. If all segments in the media object have already been cached, the process exits the cache manager routine. If all segments in the media object have not already been cached, then at step 720, the cache admission control process is invoked as will be described herein with respect to FIG. 8. Then, at step 730, a determination is made as to whether any segment not yet cached is eligible for caching, as determined by the cache admission control. If a segment not yet cached is eligible for caching, then at step 740, a cache replacement routine is invoked as will be described herein with respect to FIG. 9.

Figure 8:
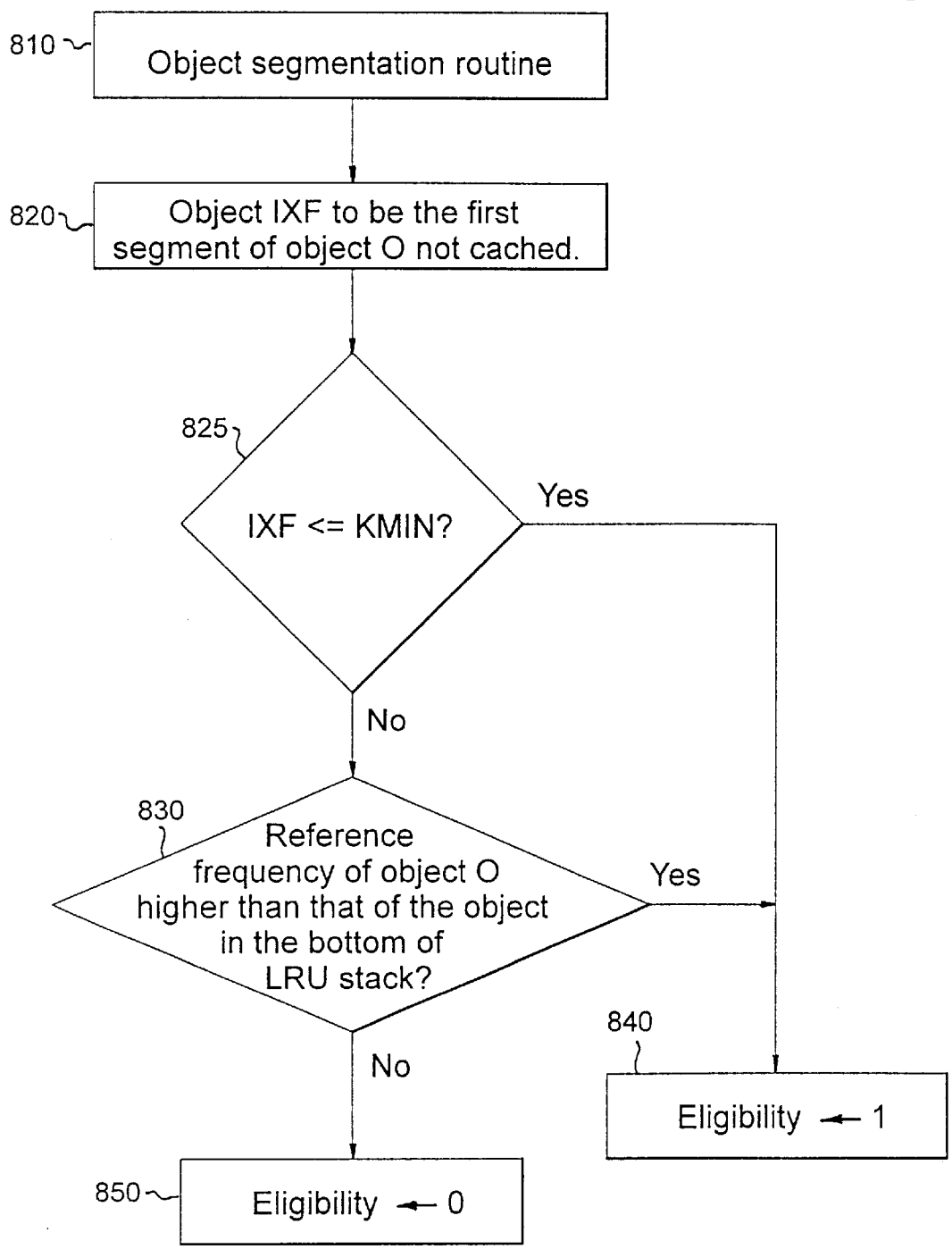
FIG. 8 is a flowchart depicting the cache admission control process.

FIG. 8 is a flowchart depicting the cache admission control process. The primary idea of cache admission control is to permit only segments from media objects which are popular enough to enter the cache. Preferably, the admission process applies different criterion to the different segments from the same media object with the basic consideration being the distance of a segment from the beginning of the media object, i.e., its segment number. As mentioned herein, the beginning segments of an object have a critical impact on the initial delay to start the video. If cached, the video may be streamed immediately to the requesters. The later segments, if not cached, may be prefetched after the request is received. However, fetching these segments does have an impact on network traffic and these later segments should still be cached if they are requested frequently enough. Thus, according to a preferred embodiment of the invention, a two tier approach to admission control is used based on the segment number: for a segment with a segment number no larger than a threshold KMIN, it is always eligible for caching. However, for a segment with a segment number larger than KMIN, it is determined eligible for caching only if its reference frequency is larger than some cached segments also with segment number larger than KMIN.

The cache admission control routine utilizes the time stamp information from the auxiliary stack to estimate the reference frequency of an object. Specifically, the reference frequency is estimated as the inverse of the time since the last reference (as given by the time stamp) to the current time. If an object requested is not already in the auxiliary stack, the time of the last previous reference is assumed to be minus infinity, so that the reference frequency will be zero.

Referring to the cache admission control routine of FIG. 8, as indicated at step 810, the object segmentation routine is invoked to divide of a media object into segments. At step 820, a value IXF is denoted as the first segment of object O which is not cached, i.e. segments 1, . . . , (IXF−1) of object O are cached. At step 825, a determination is made as to whether IXF is less than KMIN. If IXF is not less than KMIN, then at step 830, a determination is made as to whether the reference frequency of media object O is higher than that of the object currently at the bottom of the LRU stack. If the reference frequency of media object O is not higher than that of the object currently at the bottom of the LRU stack, then at step 850, the eligibility status of caching the additional segment is set to 0. Otherwise, if the reference frequency of media object O is higher than that of the object currently at the bottom of the LRU stack, then at step 840, the eligibility status of caching the additional segment is set to 1.

Those skilled in the art will appreciate that alternative criteria may be devised for admitting a media segment. For example, each segment of a media object, and each segment of a video may be given a different threshold on its reference frequency to become eligible for caching. The threshold may be set larger for segments which are further away from the start of the video. In the preferred embodiment, the two tier approach described above is equivalent to using a step function, G ( ) for the threshold. For the first KMIN segments, the threshold is set to zero, while for the remaining segments, the threshold is set to the reference frequency of the least recently requested media object. In other words, for segment i, G (i)=0, for 0<i<KMIN+1, and G (i)= Reference frequency(least recently referenced object), for i>KMIN.

Figure 9:
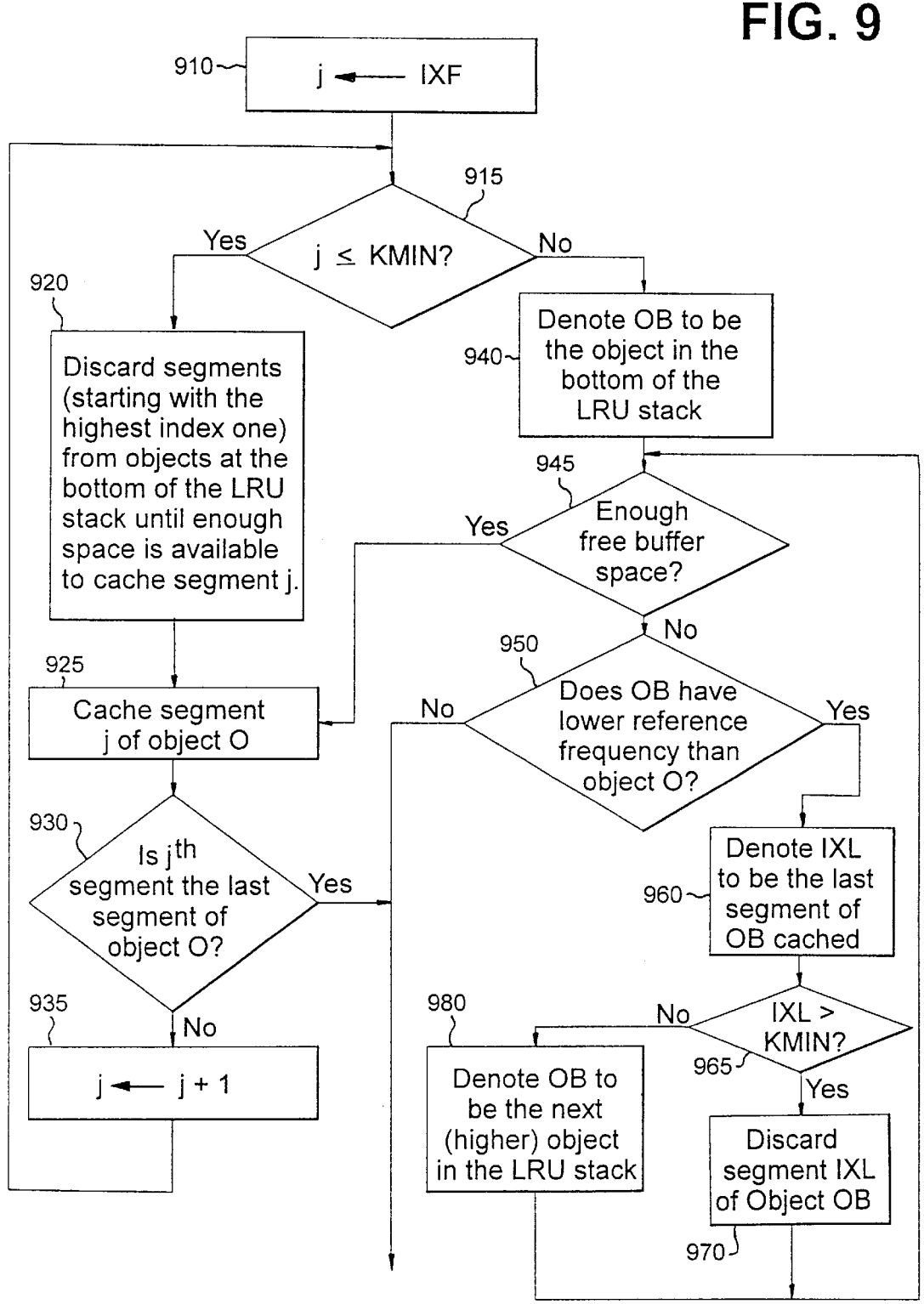
FIG. 9 is a flowchart depicting the cache replacement process.

FIG. 9 is a flowchart depicting the cache replacement process. As indicated at step 910, an index j is set to IXF which is the first segment of object O which is not cached. At step 915, a determination is made as to whether index j is less than or equal to threshold KMIN. If index j is less than or equal to KMIN, then at step 920, the highest number segment from the object at the bottom of the LRU stack is deleted. This is the segment furthest away from the start of the least referenced object. The process is repeated until enough buffer space becomes available to cache the $j^{th}$ segment of object O which is performed at step 925. At step 930, a determination is made as to whether cached segment j is the last segment of object O. If segment j is not the last segment of object O, then at step 935, index j is incremented by 1 and the process returns back to step 915. Otherwise, the cache replacement process is exited.

Referring back to step 915, if it is determined that index j is not less than or equal to KMIN, then at step 940, a variable OB is denoted as the object at the bottom of the LRU stack. At step 945, it is determined whether there is enough buffer space to cache segment j of object O. If there is enough buffer space to cache segment j of object O, then the process proceeds to step 925 to cache the segment j of object O. If there is not enough buffer space to cache segment j, then at step 950, a determination is made as to whether object OB has a lower reference frequency than object O. If at step 950, it is determined that object OB does not have a lower reference frequency than object O, then the cache replacement process is exited. If object OB has a lower reference frequency than object O, then at step 960, the value IXL is denoted as the last cached segment of object OB. Then, at step 965, a determination is made as to whether IXL is larger than KMIN. If IXL is larger than KMIN, segment IXL of object OB is discarded to increase the available buffer space and the process returns to step 945.

Otherwise, at step 980, variable OB is denoted to be the next (higher reference frequency) object in the LRU stack and the process returns to step 945.

Those skilled in the art will appreciate that alternative criteria may be devised for replacing a media segment. Generally, the replacement algorithm may assign a value to each media object. It then identifies the object with the least value and replaces its segments starting from the last segment (i.e. the segment furthest away from the start) cached. The object value function can take into account the object access frequency, its time since last reference, its access time and the object size. (In the preferred embodiment, the reference frequency is used as the object value function.) Preferential treatment may be given to the first KMIN segments so they may not be replaced by later segments (i.e., segments with a segment number larger than KMIN). Still another alternative is a cache replacement policy that replaces the least valuable segment based on any segment value function. For example, the value of a segment may be a function of its distance to the start of the media object, or, equivalently, its segment number. The segment value function may additionally depend upon its access frequency or time since last access, and/or access time to fetch the segment. In the preferred embodiment described above, this value function F ( ) for segment i of an object O may be set equal to F(i)=1/TimeSinceMostRecentReference(O)+ Reference frequency(most frequently referenced object), for 0<i<KMIN+1, and F(i)=Reference frequency(O), for i>KMIN. For the media object just requested, its Time Since Most Recent Reference is zero, so its F(i) value, for 0<i<KMIN+1, is infinite. However, its reference frequency is based on the time since the last previous reference to the present time. As mentioned above, if an object is not already in the auxiliary stack, the time of the last previous reference is assumed to be minus infinity, hence the reference frequency will be zero. So in this case, the first KMIN segments will be cached, but the remaining segments will not.

Those skilled in the art will appreciate that the segment value function may take into account the access delay to retrieve the segment. In a hierarchical proxy organization, if a segment is cached at a higher level proxy, the access time from a lower level proxy will be reduced (compared to getting the segment from the content server). As described above-mentioned U.S. patent application Ser. No. 08/831, 237, by letting the higher level proxy pass the caching information for a requested object, the lower level proxy may adjust its segment value function for making caching decisions.

Those skilled in the art will also appreciate that although in the preferred embodiment the admission control and caching managers are invoked after the delivery of the media object is completed, these routines may additionally be invoked right after each segment is delivered to determine whether that segment needs to be cached.

Figure 10:
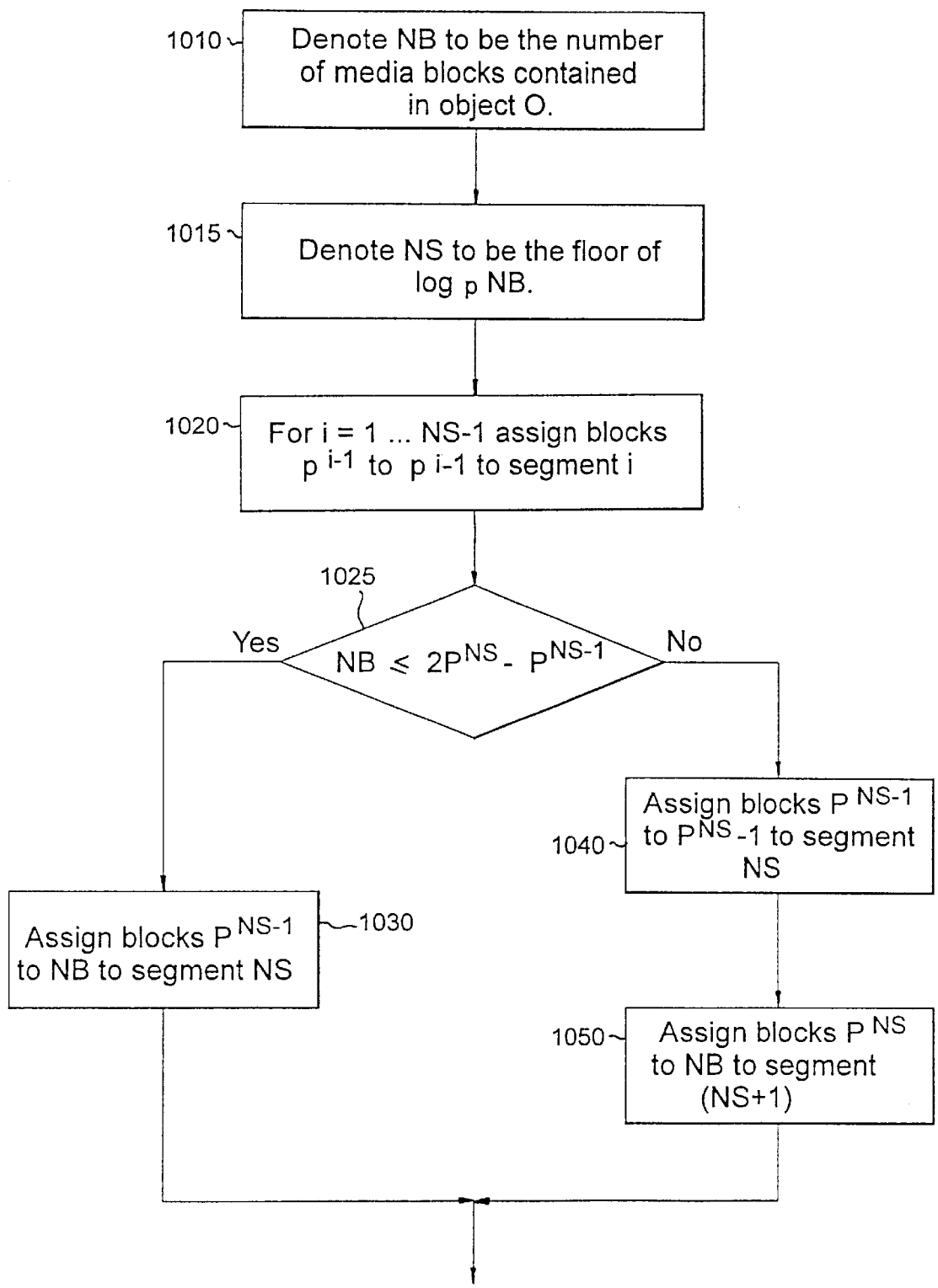
FIG. 10 is a flowchart depicting the object segmentation process.

FIG. 10 is a flowchart depicting the object segmentation process. As indicated at step 1010, a variable NB is denoted the number of media blocks comprising a media object O. At step 1015, let NS denote the largest integer smaller that $\log_p$ NB, (i.e. its floor). At step 1020, media blocks $p^{i-1}, \ldots, p^i-1$ are assigned to segment i, for i=1, ..., (NS-1). Then, at step 1025, a determination is made as to whether NB is less than or equal to $2p^{NS}-p^{(NS-1)}$. If NB is less than or equal to $2p^{NS}-p^{(NS-1)}$, then blocks $p^{NS}, \ldots,$ NB are assigned to segment NS. Otherwise, as indicated at step 1040, blocks $p^{(NS-1)}, \ldots, (p^{NS}-1)$ are assigned to segment NS. Then, at step 1050, blocks $p^{NS}, \ldots,$ NB are assigned to segment (NS+1).

The object segmentation example illustrated in FIG. 3 corresponds to the case where p=2. However, those skilled in the art will appreciate that there are many alternative ways to form segments that allow the later segments to have larger sizes. The segmentation may additionally be made to depend upon the total size of the media object. For example, one alternative is to give a fixed size (say 1 Mbyte) to the first few segments, and equally divide the remaining blocks into a fixed number of segments.

Those skilled in the art will appreciate that the invention described herein may be generalized to the case with multiple proxies. Multiple proxies may be necessary to handle customer demand, and can also be used to ease network congestion, balance load, gracefully handle peak traffic conditions and provide fault tolerance.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for caching media objects in a proxy device that implements a streaming application for enabling delivery of multimedia object streams across a network, said method comprising the steps of:

a) receiving request for media object stream;

b) grouping a requested media object into a plurality of segments, each segment comprising a consecutive number of blocks of a media object;

c) determining a cache eligibility value for each non-cached segment, said cache eligibility value of a segment being a function of its distance to a start segment of said media object; and, d) caching segments based on said cache eligibility value.

2. The method according to claim 1, wherein said determining step includes the step of comparing a distance for a segment with an assigned distance threshold.

3. The method according to claim 2, wherein said distance threshold is larger for the segment further away from a start segment of the media object, a segment group having consecutive blocks further away from the start segment of said media object being of larger size than a segment group including blocks a shorter distance from said a start segment.

4. The method according to claim 3, wherein, except for a last segment of a media object, a number of consecutive blocks contained in an i-th segment is p times larger than an amount of blocks in an (i−1)-th segment.

5. The method according to claim 4, further including a step of defining a minimal segment number value KMIN such that first KMIN segments are always eligible for caching.

6. The method according to claim 1, wherein said cache eligibility value of a segment is a function of that segment's access frequency, said determining step further including the step of comparing a segment's access frequency value with an access frequency threshold value.

7. The method according to claim 6, wherein said access frequency value is a function of a time since a last request for said media object.

8. The method according to claim 4, wherein said access frequency threshold value is a function of a reference frequency of a least recently requested media object.

9. The method according to claim 6, further including a step of tracking last access times of a media object to enable calculation of a segment's access frequency.

10. The method according to claim 1, wherein upon receipt of a request, a step of determining if said object is partially cached in said proxy, whereby for a partially cached media object, said proxy delivering beginning segments cached and generating a prefetch request to retrieve remaining blocks of said requested media object from a media object content source.

11. The method according to claim 10, wherein a collection of proxy devices is provided, said step of caching segments being additionally based on a presence of other replicas of a segment cached at another proxy device.

12. The method according to claim 11, wherein said media object content source includes another proxy device.

13. The method according to claim 1, wherein said step of caching segments further includes a step of replacing already cached segments with new requested segments according to a cache replacement policy.

14. The method according to claim 13, wherein said replacing step includes the steps of:

determining a number of additional segments of a new requested media object to be cached; and, determining already cached segments to be replaced by said additional segments.

15. The method according to claim 14, wherein said step of determining already cached segments includes identifying a least valuable media object cached based on an object value function, and replacing last segments cached of said least valuable object.

16. The method according to claim 15, wherein said object value function is based on an object reference frequency or its time since last reference.

17. The method according to claim 15, wherein the said object value function is based on an object size.

18. The method according to claim 15, wherein the said object value function is based on its access time.

19. The method according to claim 14, wherein said cache replacement policy includes enabling a first KMIN segments of the requested media object to be cached replacing the segments from the least valuable object in the cache.

20. The method according to claim 19, wherein said replacement policy includes preventing segments having segment number larger than KMIN to replace the first KMIN segments of other media objects cached.

21. The method according to claim 20, further including step of determining a next to least valuable media object having segments cashed for replacement when a last segment from the least valuable object in the cache is no larger than KMIN.

22. The method according to claim 13, wherein a cache replacement policy includes replacing current least valuable segments cached based on a segment value function.

23. A method for a plurality of proxy servers to cache and deliver media object content as a media content stream, said method comprising:

grouping object blocks from each media object into a plurality of segments;

implementing a cache assignment policy for selecting one or more segments of a media object to cache among said multiple proxy servers, said selected one or more segments comprising a partial replication to a proxy server; and, upon receipt of a user request for a media object, delivering a beginning cached segment of said requested media object and generating a prefetch request to retrieve remaining segments of said requested media object from another proxy server or content source.

24. The method of claim 23, wherein an assignment policy includes determining a number of partial replications for each media object, a partial replication including consecutive segments beginning from a start of a media object, a number of segments in each partial replication and, a proxy server assigned to cache said partial replication.

25. The method of claim 24, wherein a segment is of non-uniform size.

26. The method of claim 24, wherein the segment further away from the start is of larger size.

27. The method of claim 23, wherein said assignment further includes determining factors including one or more selected from a group comprising: a reference frequency of each media object, a size of each partial replica, the number of blocks in each partial replica of the media object, a bandwidth and a storage constraint, said method utilizing said factors for improving a response time or quality of media streaming service.

28. A program storage device readable by a machine, tangibly embodying a program of instructions executable by the machine to perform method steps for caching media objects in a proxy device that implements a streaming application for enabling delivery of multimedia object streams across a network, said method steps comprising:

a) receiving request for media object stream;

b) grouping a requested media object into a plurality of segments, each segment comprising a consecutive number of blocks of a media object;

c) determining a cache eligibility value for each non-cached segment, said cache eligibility value of a segment being a function of its distance to a start segment of said media object; and, d) caching segments based on said cache eligibility value.

29. The program storage device readable by a machine according to claim 28, wherein said determining step includes the step of comparing a distance for a segment with an assigned distance threshold.

30. The program storage device readable by a machine according to claim 29, wherein said distance threshold is larger for the segment further away from a start segment of the media object, a segment group having consecutive blocks further away from the start segment of said media object being of larger size than a segment group including blocks a shorter distance from said a start segment.

31. The program storage device readable by a machine according to claim 30, wherein, except for a last segment of a media object, a number of consecutive blocks contained in an i-th segment is p times larger than an amount of blocks in an (i−1)-th segment.

32. The program storage device readable by a machine according to claim 31, further including a step of defining a minimal segment number value KMIN such that first KMIN segments are always eligible for caching.

33. The program storage device readable by a machine according to claim 28, wherein said cache eligibility value of a segment is a function of that segment's access frequency, said determining step further including the step of comparing a segment's access frequency value with an access frequency threshold value.

34. The program storage device readable by a machine according to claim 33, wherein said access frequency value is a function of a time since a last request for said media object.

35. The program storage device readable by a machine according to claim 33, wherein said access frequency threshold value is a function of a reference frequency of a least recently requested media object.

36. The program storage device readable by a machine according to claim 28, wherein upon receipt of a request, a step of determining if said object is partially cached in said proxy, whereby for a partially cached media object, said proxy delivering beginning segments cached and generating a prefetch request to retrieve remaining blocks of said requested media object from a media object content source.

37. The program storage device readable by a machine according to claim 28, wherein said step of caching segments further includes a step of replacing already cached segments with new requested segments according to a cache replacement policy.

38. A media content storage and delivery system comprising:

one or more content servers for storing media object content;

one or more proxy servers associated with a content server, a proxy server device having streaming application for delivering media object streams to a client;

a cache admission means provided in one or more proxy servers for determining cache eligibility for segments of a media object based on a distance criteria from an assigned number value of a segment to a start segment of a requested media object; and, means for caching one or more media object segments based on said cache eligibility status.

39. The system according to claim 38, further including request handler means for receiving a media object request and determining if said media object is partially cached in a proxy device.

40. The system according to claim 39, wherein upon determination of a partially cached requested media object, said proxy server enabling delivery of beginning segments cached, and, said request handler means generating a prefetch request to retrieve remaining segments of said requested media object from another of said one or more proxy servers or media object content source.

41. The system according to claim 38, wherein said cache admission means includes means for comparing a distance associated with a segment with an assigned distance threshold.

42. The system according to claim 41, wherein said distance threshold is larger for the segment further away from a start segment of the media object, a segment comprising consecutive blocks of said media object further away from the start segment of said media object being of larger size than a segment group including blocks a shorter distance from said a start segment.

43. The system according to claim 41, wherein said cache admission means defines a minimal segment number value KMIN such that first KMIN segments are always eligible for caching.

44. The system according to claim 38, wherein said cache eligibility value of a segment is a function of that segment's access frequency, said cache admission means comparing a segment's access frequency value with an access frequency threshold value.

45. The system according to claim 44, wherein said access frequency value is a function of a time since a last request for said media object.

46. The system according to claim 45, wherein said access frequency threshold value is a function of a reference frequency of a least recently requested media object.

47. The system according to claim 44, wherein a proxy server further includes means for tracking last access times of a media object for enabling calculation of a segment's access frequency.

* * * * *